No. 747,229. Patented December 15, 1903.

UNITED STATES PATENT OFFICE.

CLAUDE A. O. ROSELL, OF NEW YORK, N. Y., ASSIGNOR TO COMPOSITE STONE AND BRICK COMPANY, A CORPORATION OF DELAWARE.

INDURATED STONE.

SPECIFICATION forming part of Letters Patent No. 747,229, dated December 15, 1903.

Application filed February 2, 1903. Serial No. 141,564. (No model.)

*To all whom it may concern:*

Be it known that I, CLAUDE A. O. ROSELL, a citizen of the United States, and a resident of New York, in the county of New York and State of New York, have invented a certain new and useful Improvement in Indurated Stone, of which the following is a specification.

This invention relates to indurated stone and process of making the same. The main ingredient of the composition is usually silica or material in which silica preponderates, such as sand. As a binding agent I make use of a soluble aluminate, such as sodium aluminate or barium aluminate, preferably the former. The composition, therefore, in its simplest form consists of silica and sodium aluminate. In this composition lime, the usual binding agent, is dispensed with, being incompatible with a soluble aluminate, as it would immediately decompose it and form calcium aluminate, which is entirely insoluble and of less value as a binding agent than lime.

In making the composition from one to four per cent. of sodium or potassium aluminate, by weight, is used with the sand, these proportions being an illustration not a limitation. After the ingredients have been thoroughly mixed, the mixture is moistened with water in sufficient quantity to be capable of molding by mechanical pressure, after which it is indurated in any preferred manner, no novelty being claimed for the feature of induration.

An alkaline silicate is compatible with an alkaline aluminate, and they may be used together advantageously, in which case the quantity of the alkaline aluminate preferably preponderates.

The alkaline aluminate, whether alone or with alkaline silicate, may be used in the form of powder, or it may be dissolved in water and the solution may be used to moisten the powdered silica previous to the mechanical molding. The action of the alkaline aluminate, such as sodium aluminate, upon the silica is as follows: During the induration the sodium aluminate acts upon the silica forming the insoluble sodium-aluminium silicate which is known in mineralogy as "albite" or "sodafeldspar." If potassium aluminate is used, the insoluble potassium-aluminium silicate or feldspar will be produced. It will thus be seen that by the chemical reaction the soluble aluminate is entirely converted into an insoluble product, which thus formed has a great binding effect. Soluble aluminate will also be found an excellent hardening agent when applied to the surface of partly-indurated articles. Likewise a mixture of alkaline aluminate and silicate may be used for this purpose.

The binding agent described may be used not only with silica, but also with other materials in making composite stone if enough silica be present to form an insoluble silicate during the operation of induration and in which the main material of the composition may consist of calcium carbonate, clay, or pulverized slag or clinkers.

Besides sodium silicate other binding agents that are compatible with alkaline aluminate may be used with it, such as sodium chlorid. All calcium and magnesium compounds, alum, hydrochloric acid, and some other substances used or proposed as hardening agents are incompatible with a soluble aluminate.

What I claim as new is—

1. A molded article of composite stone composed of an indurated mixture of silica and soluble aluminate.

2. The process of making composite stone, consisting in mixing silica and soluble aluminate, forming into articles of desired shape and indurating the same.

3. The process of making composite stone, consisting in mixing silica, alkaline aluminate and alkaline silicate, forming it into articles of desired shape and indurating the same.

4. The process of making composite stone, consisting in mixing the constituent ingredients, forming into articles of desired shape, partly indurating the same, applying a solution containing soluble aluminate and completing the induration.

Signed at New York, in the county of New York and State of New York, this 30th day of January, A. D. 1903.

CLAUDE A. O. ROSELL.

Witnesses:
LYNN F. LEET,
B. F. KEINARD.